United States Patent [19]

Sakurai et al.

[11] Patent Number: 5,621,849
[45] Date of Patent: Apr. 15, 1997

[54] VOICE RECOGNIZING METHOD AND APPARATUS

[75] Inventors: Atsushi Sakurai, Yokohama; Junichi Tamura, Tokyo; Tetsuo Kosaka, Kyoto; Hiroshi Matsuo, Akita, all of Japan

[73] Assignee: Canon Kabushiki Kaisha, Tokyo, Japan

[21] Appl. No.: 371,494

[22] Filed: Jan. 11, 1995

Related U.S. Application Data

[63] Continuation of Ser. No. 895,007, Jun. 8, 1992, abandoned.

[30]    Foreign Application Priority Data

Jun. 11, 1991   [JP]   Japan ................................... 3-139092

[51] Int. Cl.$^6$ ................. G10L 5/06; G10L 9/00
[52] U.S. Cl. ............................. 395/2.5; 395/2.4
[58] Field of Search ............... 381/41–43; 395/2, 395/2.48, 2.47, 2.5, 2.4, 2.52, 2.53, 2.55

[56]    References Cited

U.S. PATENT DOCUMENTS

| | | | |
|---|---|---|---|
| 4,596,032 | 6/1986 | Sakurai et al. | 381/51 |
| 4,712,243 | 12/1987 | Ninomiya et al. | 381/43 |
| 4,718,095 | 1/1988 | Asakawa et al. | 381/43 |
| 4,736,429 | 4/1988 | Niyada et al. | 381/43 |
| 4,802,224 | 1/1989 | Shiraki et al. | 381/34 |
| 4,802,226 | 1/1989 | Watanabe | 381/43 |
| 4,817,159 | 3/1989 | Hoshimi et al. | 381/43 |
| 4,821,325 | 4/1989 | Martin et al. | 381/46 |
| 4,856,067 | 8/1989 | Yamada et al. | 381/45 |
| 4,885,791 | 12/1989 | Fujii et al. | 381/43 |
| 4,888,823 | 12/1989 | Nitta et al. | 381/43 |
| 5,131,043 | 7/1992 | Fujii et al. | 381/41 |
| 5,181,256 | 1/1993 | Kamiya | 382/14 |

OTHER PUBLICATIONS

"Isolated Words Recognition Using DP Matching and Mahalanobis Distance", Journal of Electro–Communication, vol. J66–A, No. 1, T. Takara et al. (Jan. 1983), pp. 64–70.

"Detection of Segment Type Features for Continuous Speech Recognition", The Acoustical Society of Japan, Transaction No. S 585–53, T. Kosaka et al. (Dec. 19, 1985) pp. 405–412.

"A Connected Spoken Recognition Method by O(n) Dynamic Programming", ICASSP '83, vol. 1, I Nakagawa (Apr. 1983), pp. 296–299.

"Dynamic Time Warping and Vector Quantization in Isolated and Connected Word Recognition", European Conference on Speech Technology, vol. 2, A. Boyer et al. (Sep. 1987), pp. 436–439.

(List continued on next page.)

*Primary Examiner*—Allen R. MacDonald
*Assistant Examiner*—Richemond Dorvil
*Attorney, Agent, or Firm*—Fitzpatrick, Cella, Harper & Scinto

[57]    ABSTRACT

A voice recognizing method apparatus in which an input voice is recognized by obtaining a similar pattern by comparing the input voice and voice standard patterns. Voice standard patterns are stored into a memory. A voice is inputted. Voice duration lengths and distances are calculated by performing matching processes between the input voice and the standard patterns. The distance is corrected in accordance with the voice duration length so that the voice duration length having the best matching result is used as a reference, or such that the distance is small as the voice duration length is long. A recognition result is determined in accordance with the corrected distance. The matching is executed by a word spotting method. The input voice to be matched and the voice standard patterns are expressed by voice characteristic parameters.

36 Claims, 10 Drawing Sheets

OTHER PUBLICATIONS

"Consonant Recognition Methods For Unspecified, Speakers Using BPF Powers and Time Sequence of LPC Cepstrum Coefficients", Systems and Computers in Japan, vol. 18, No. 6, K. Niyada et al. (Jun. 1987), pp. 47–59.

"Automatic Organization of Word Spotting Reference Patterns", Review of the Electrical Communications Laboratories, vol. 35, No. 6, T. Kawabata et al. (Nov. 1987), pp. 681–686.

"A connected Spoken Recognition Method by O(n) Dynamic Programming ," ICASSP '83, vol. 1, Wakagawa, pp. 296–299.

Ishikawa et al., "A real time connected word recognition system". Proceedings. 10th International Conference on Pattern Recognition Jun. 1990.

FIG. 2

| WORD NO. | WORD |
|---|---|
| 1 | ゼロ ("ZERO", ZERO) |
| 2 | サン ("SAN", THREE) |
| 3 | ニ ("NI", TWO) |
| 4 | レイ ("REI", ZERO) |
| 5 | ナナ ("NANA", SEVEN) |
| 6 | ヨン ("YON", FOUR) |
| 7 | ゴ ("GO", FIVE) |
| 8 | マル ("MARU", ZERO OR O) |
| 9 | シ ("SHI", FOUR) |
| 11 | ロク ("ROKU", SIX) |
| 10 | ク ("KU", NINE) |
| 12 | ハチ ("HACHI", EIGHT) |
| 13 | シチ ("SHICHI", SEVEN) |
| 14 | キュウ ("KYUU", NINE) |
| 15 | イチ ("ICHI", ONE) |
| 16 | ハイ ("HAI", YES) |
| 17 | イイエ ("IIE", NO) |

| FRAME 1 | $m_1$ | $\Sigma_1^{-1}$ |
| FRAME 2 | $m_2$ | $\Sigma_2^{-1}$ |
| FRAME j | $m_j$ | $\Sigma_j^{-1}$ |
| FRAME J | $m_J$ | $\Sigma_J^{-1}$ |

KYUU 5.68

4.00

ROKU 3.51
KU 3.34 roku

FIG. 8

| ORDER | WORD | SCORE | TIME LENGTH (ms) | CORRECTION COEFFICIENT | SCORE CORRECTED | ORDER CORRECTED |
|---|---|---|---|---|---|---|
| 1 | KU | 3.34 | 70 | — | 3.34 | 2 |
| 2 | ROKU | 3.51 | 165 | 0.71 | 2.48 | 1 |
| 3 | KYUU | 5.68 | 105 | 1.11 | 6.32 | 3 |
| 4 | YON | 5.71 | 100 | 1.17 | 6.66 | 4 |
| 16 | SI | 16.97 | 130 | 0.90 | 15.23 | 16 |
| 17 | IIE | 31.30 | 130 | 0.90 | 28.09 | 17 |

FIG. 10

| ORDER | WORD | SCORE | TIME LENGTH (ms) | CORRECTION COEFFICIENT | SCORE CORRECTED | ORDER CORRECTED |
|---|---|---|---|---|---|---|
| 1 | KU | 3.84 | 140 | — | 3.84 | 1 |
| 2 | ROKU | 5.83 | 160 | 1.46 | 8.51 | 4 |
| 3 | KYUU | 6.48 | 180 | 1.30 | 8.40 | 3 |
| 4 | MARU | 6.80 | 205 | 1.14 | 7.75 | 2 |
| 16 | SI | 21.05 | 175 | 1.33 | 28.07 | 16 |
| 17 | IIE | 31.03 | 145 | 1.61 | 57.98 | 17 |

VOICE RECOGNIZING METHOD AND APPARATUS

This application is a continuation of application Ser. No. 07/895,007, filed Jun. 8, 1992, now abandoned.

BACKGROUND OF THE INVENTION

1. Field of the Invention

The invention relates to a method and an apparatus for voice recognition in which a similar voice pattern is obtained by comparing an input voice pattern voice and a voice standard pattern.

2. Related Background Art

As a method of voice recognition, for example, like a continuous DP method, there has been used a word spotting method whereby a matching is executed while sequentially sliding a standard pattern for an input voice and a detection at a voice duration and a recognizing process are simultaneously executed on the basis of a distance as a result of the matching.

The word spotting method is a method whereby the matching process is performed while sliding word standard patterns each consisting of characteristics of a voice such as a spectrum or the like for the input voice on a frame unit basis and a duration at which it is presumed that the word exists is detected by a point at which a score as a calculation result of the matching process has the minimum value in each standard pattern, and, after that, the minimum values of the scores of all of the standard patterns are compared, thereby obtaining a recognition result.

According to the conventional word spotting method, however, there is a drawback in that, in the case where a phoneme train constructing a certain standard pattern perfectly coincides with a part of a phoneme train of another standard pattern having a larger number of phonemes, an erroneous recognition cannot be avoided in principle. For example, in the case where there is /roku/ in addition to /ku/ as a standard pattern, when the input voice is /roku/, the standard patterns /ku/ and /roku/ each perfectly coincide with a part or all of the input voice. Therefore, although the scores of both of the above patterns are higher than those of the remaining standard patterns as a result of the matching process, there is no clear difference between the scores shown by the respective patterns so long as the input voice is normally pronounced. The pattern /roku/ is set to the first order or /ku/ is set to the first order depending on a slight fluctuation of the input voice. That is, according to the conventional example, there is a drawback in that, even when the input voice is normally pronounced, an erroneous recognition cannot be avoided because of a defect of the word spotting method in principle.

SUMMARY OF THE INVENTION

It is an object of the invention to correct a score of matching in accordance with a length of voice duration detected as a result of a word spotting, a recognition which can cope with a length of voice is performed to thereby improve the recognition rate.

Another object of the invention is to prevent an error, for example, where "ku" is recognized from an input voice of "roku", by correcting the score of the matching mentioned above so as to raise the score when the voice duration is long.

Still another object of the invention is to correct the score of the matching mentioned above in accordance with the circumstances of each of the input voice and the matched patterns by correcting the matching score by a relative value while using the cut-out voice duration length of the pattern whose score has been set to the first order as a reference.

Yet another object of the invention is that the matching score is compared with a predetermined threshold value, and when it is determined that a rejection process is not to be performed, a correcting process is executed, thereby reducing a processing time without performing a vain correcting process.

BRIEF DESCRIPTION OF THE DRAWINGS

FIG. 2 is a diagram showing an example of a list of words registered in a word dictionary;

FIG. 8 is a diagram showing an example of the result of the score correction;

FIG. 10 is a diagram showing an example of the result of the score correction for a short input voice.

DESCRIPTION OF THE PREFERRED EMBODIMENTS

Figure 1:
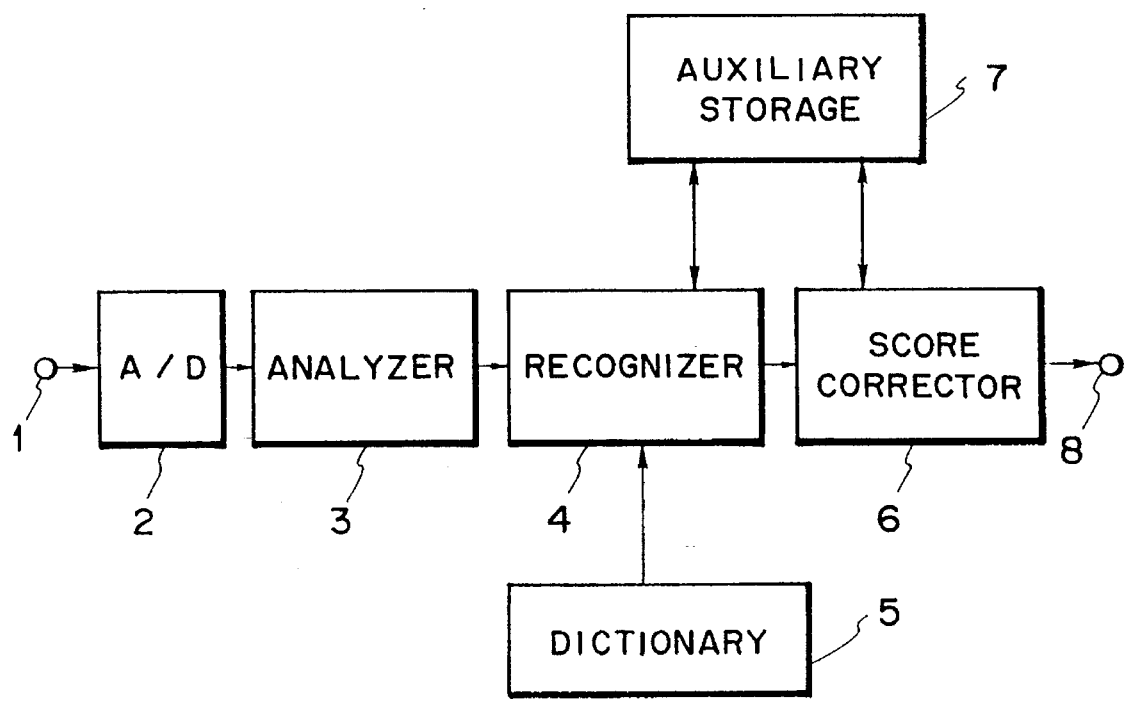
FIG. 1 is a block diagram of a voice recognizing apparatus embodying the invention.

FIG. 1 is a block diagram showing an embodiment of the present invention. Reference numeral 1 denotes an input terminal of a voice; 2 indicates an A/D converter; 3 indicates a characteristic parameter analyzer; 4 indicates a recognizer; 5 indicates a word dictionary which is used when the recognizer 4 executes a recognizing process; 6 indicates a score corrector according to the invention; 7 indicates an auxiliary storage device; and 8 indicates an output terminal of the recognition result.

The voice supplied from the input terminal 1 is A/D converted by the A/D converter 2 and, after that, is analyzed by the analyzer 3 at a frame period of 10 msec and is converted into a time series of an LPC cepstrum coefficient vector. In the recognizer 4, the time series of the LPC cepstrum coefficient vector is matched with a word standard pattern stored in the word dictionary 5 using the auxiliary storage device 7.

The present embodiment will now be described with respect to an example in which the recognition of seventeen words shown in FIG. 2 is an object. The standard patterns of seventeen words shown in FIG. 2 are stored in the word dictionary 5 by variable lengths. The present invention is not limited to the present embodiment of seventeen words; the present invention may be used with any words so long as the word standard patterns are previously stored in the word dictionary 5.

Figures 3, 4:
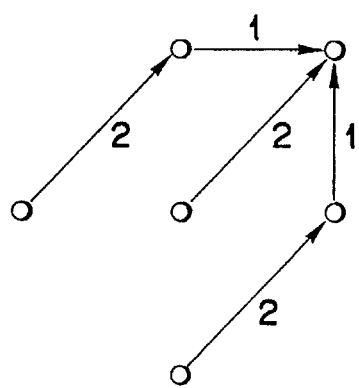
FIG. 3 is a diagram showing an example of a construction of a word standard pattern.
FIG. 4 is a diagram showing an example of a form of a DP path.

The present embodiment relates to a voice recognizing apparatus which is used for an unspecified speaker and uses a Mahalanobis distance as a distance scale. Therefore, as shown in FIG. 3, each of the word standard patterns which are stored in the word dictionary 5 is obtained by the following method. Namely, word voices pronounced by a plurality of speakers are analyzed at a frame period of 10 msec and are converted into corresponding LPC cepstrum coefficient vectors, the number of frames is normalized, and after that, a mean vector $m_j$ and a variance-covariance matrix $\Sigma_j^{-1}$ are obtained for each frame.

The conventional word spotting method will now be described.

A matching of a time series $\{x_i\}$ of the LPC cepstrum coefficient vectors generated by the analyzer 3 and the word standard patterns in the word dictionary 5 is executed by the recognizer 4 in accordance with the following procedure using a continuous DP.

First, equations which are used in the word spotting are shown.

$$d(i, j) = (x_i - m_j) \sum_j^{-1} (x_i - m_j) \quad (1)$$

$$p(i, j) = \min \begin{cases} p(i-2, j-1) + 2d(i-1, j) + d(i, j) & (a) \\ p(i-1, j-1) + 2d(i, j) & (b) \\ p(i-1, j-2) + 2d(i, j-1) + d(i, j) & (c) \end{cases} \quad (2)$$

$$C(i, j) = \begin{cases} C(i-2, j-1) + 3 & \text{if (a)} \\ C(i-1, j-1) + 2 & \text{if (b)} \\ C(i-1, j-2) + 3 & \text{if (c)} \end{cases} \quad (3)$$

$$D(i, j) = p(i, J)/C(i, J) \quad (4)$$

where,
i: frame number of the input voice
j: frame number of the standard pattern
$x_i$: input vector in the ith frame
$m_j$: means vector in the jth frame
$\Sigma_j^{-1}$: variance-covariance matrix in the jth frame The word sporting process is performed by using the above equations in accordance with the following procedure. A form of DP path is as shown in FIG. 4.

(1) A Maharanovis distance d(i, j) of the input vector $x_i$ and means vector $m_j$ of the standard pattern is obtained in accordance with equation (1).

(2) An accumulated distance p(i, j) is obtained in accordance with equation (2).

(3) An optimum path length c (i, j) is obtained in accordance with equation (3).

(4) The processes in the above items (1) to (3) are repeated from the head frame of the word standard pattern to the final frame.

(5) A DP value d(i) of the input vector $x_i$ and the word standard pattern is obtained in accordance with equation (4), where J indicates the final frame number of each word standard pattern.

(6) The processes in the above steps (1) to (5) are repeated from the head frame of the input voice to the final frame.

(7) The minimum value of the DP value is obtained for each word standard pattern and is set to a score for each word standard pattern for the input voice.

Figure 5:
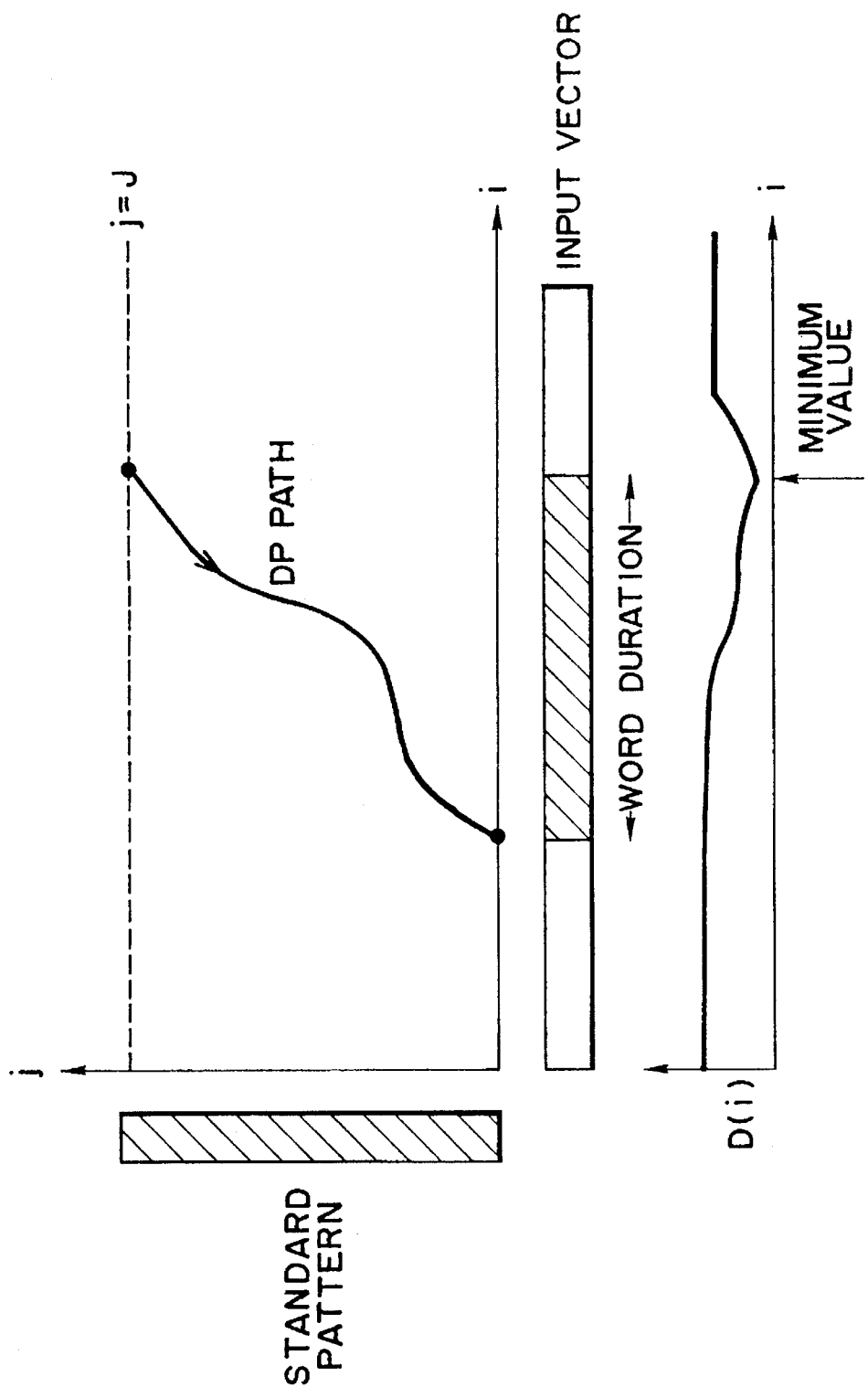
FIG. 5 is a diagram to explain the detection of a voice duration.

The word duration is detected by deciding a DP path by back tracking from a position at which the DP value D(i) of each standard pattern has the minimum value, as described in step (7) of the above procedure, and as shown in FIG. 5.

The above method relates to the conventional word spotting method. In a preferred embodiment of the present invention however, in order to overcome a defect in principle of the conventional method, the score is corrected using a voice duration length detected in the score corrector 6.

Figure 6:
FIG. 6 is a diagram showing the detection of the voice duration by a word spotting method and a score.

FIG. 6 shows matching scores of the word standard patterns for the input voice /roku/ together with the word duration determined by a word spotting method, in which an axis of the abscissa indicates the time and an axis of the ordinate shows the score. FIG. 6 relates to the conventional method in which the score is not corrected. A threshold value to decide whether a rejection process is performed or not is set to 4.00. When a word of a score smaller than the threshold value doesn't exist, a rejection process is executed. According to FIG. 6, in the case of the word standard pattern /roku/, the voice duration of /roku/ is correctly detected from the input voice by the word spotting method, and the score also indicates 3.51 which is less than the threshold value. However, the word standard pattern /ku/ matches with a part /ku/ of the input voice/roku/and indicates the score 3.34 of the first order. Thus, in the conventional method, /ku/ is selected as a correct solution and the result shows an erroneous recognition. However, by paying attention to the voice duration which has been cut out as a result of the word spotting method, the voice duration length of the word standard pattern /roku/, in which the number of syllables is large, is longer than the voice duration length of the word standard pattern /ku/ of one syllable. In the present embodiment, attention is paid to such a point, the voice duration length of the score of the first order is used as a reference, and the scores of the second and subsequent orders are corrected so as to be inversely proportional to the detected voice duration length of each word standard pattern. That is, they are corrected in a manner such that, as the detected voice duration interval of the score becomes longer, the score becomes better.

Figure 7:
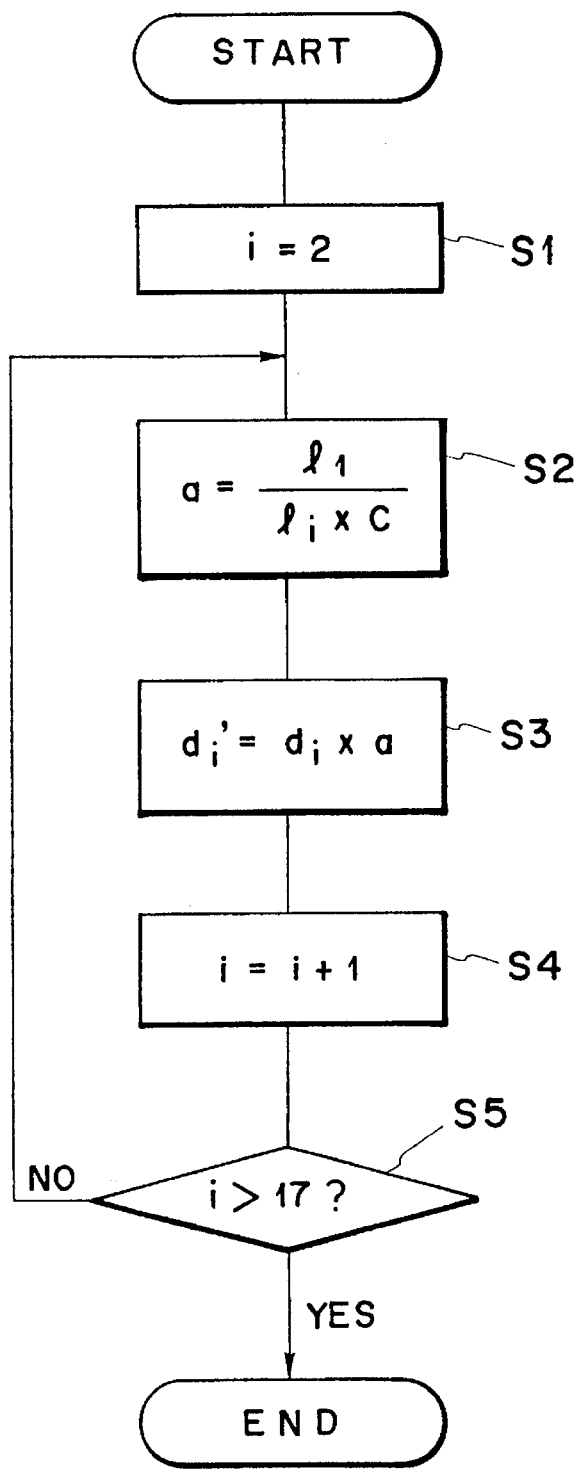
FIG. 7 is a flowchart showing a procedure for the score correction using a voice duration length.

A procedure for score correcting processes by the score corrector 6 will now be described with reference to a flowchart of FIG. 7. In FIG. 7, "1" denotes an auxiliary variable; "a" indicates a score correction coefficient decided; "$l_i$" indicates a voice duration length of the ith order; "c" "a" indicates a voice duration length adjustment coefficient; "$d_i$" indicates a score of the ith order before correction; and "$d_i'$" indicates a score of the ith order after correction. The following processes are executed using the auxiliary storage device 7.

(S1) A numerical value 2 is set into the auxiliary variable i.

(S2) The voice duration length $l_1$ of the score of the first order is divided by the result of the multiplication of the voice duration length $l_i$ of the score of the ith order and the voice duration length adjustment coefficient c and the result is substituted for a.

(S3) The correction coefficient a is multiplied by the score $d_i$ of the ith order and the result is substituted for $d_i'$.

(S4) A numerical value 1 is added to the auxiliary coefficient i.

(S5) A check is made to see if the auxiliary coefficient i is larger than the numerical value 17 or not. When it is not larger than 17, the processing routine is returned to step (S2). When it is larger than 17, processing is finished.

FIG. 8 shows the results of the correcting processes which were executed by the score corrector 6 to the output from the recognizer 4 for the input voice /roku/ on the basis of the flowchart of FIG. 7. The processes will be ,described in detail with reference to the flowchart of FIG. 7. The voice duration length adjustment coefficient c is provided in order to improve the score of the word standard pattern having a sufficiently long voice duration and it is now assumed that c=0.60 and is set so that the effect of the score improvement appears when the voice duration length is equal to or longer than 5/3 of that of the score of the first order.

(S1) A numerical value 2 is set into the auxiliary variable i.

(S2) By setting a=70/(165×0.60), a=0.71 is obtained as a correction coefficient.

(S3) By setting $d_2'=3.51\times0.71$, the correction score $d_2'$ for the second order is obtained.

By calculating the correction scores of the third and subsequent orders in a manner similar to the above, the results shown in the column of "score corrected" in FIG. 8 are obtained. As for the order after completion of the score correction, the order of the word standard pattern /roku/ is the first order since its word duration length is equal to 2.48. Due to this result, the score corrector 6 generates the word number 10 of the word standard pattern /roku/ indicative of the score of the first order from the output terminal 8 and the recognizing process is completed. That is, the erroneous recognition in the conventional method can be prevented by the present invention.

Figure 9:
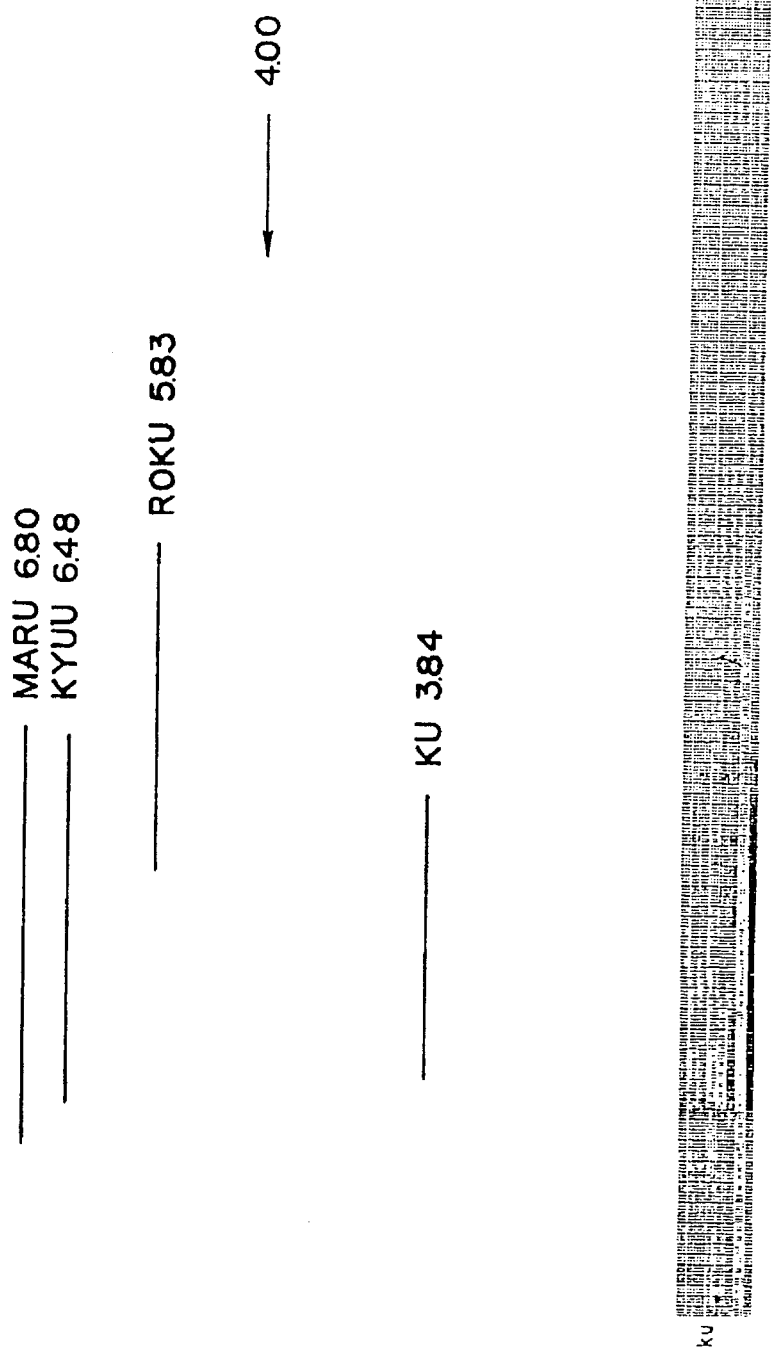
FIG. 9 is a diagram showing the detection of the voice duration for a short input voice and a score.

An example in which the voice duration length of the input voice is short will now be described. FIG. 9 shows the matching scores of the word standard patterns for the input voice /ku/ together with the word durations determined by the word spotting. In FIG. 9, an axis of the abscissa denotes the time and an axis of the ordinate indicates the score. A threshold value for rejection is also similarly set to 4.00. According to FIG. 10, in the case of the word standard pattern /ku/, the voice duration of /ku/ is correctly detected from the input voice by the word spotting method, and the length of score is also equal to 3.84, lower than the threshold value. For the result of the matching process, FIG. 10 shows the result of the score correcting operation performed by the score corrector 6 in accordance with the flowchart shown in FIG. 7. Since the continuation time length of the input voice is short, each of the voice duration lengths determined as a result of the word spotting doesn't have a sufficient length. Even after completion of the correction, a reverse phenomenon doesn't occur between the score of the first order and the scores of the second and subsequent orders. That is, so long as the number of syllables of the input voice is large, an effect of the score correction based on the voice duration length is made effective.

Figure 11:
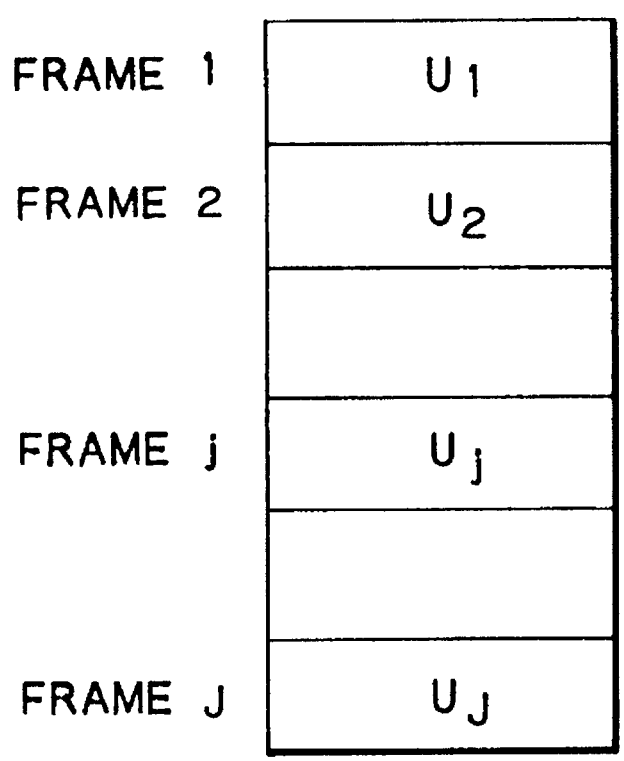
FIG. 11 is a diagram showing another example of a construction of a word standard pattern.

Although the effect of the present invention has been described above with respect to the voice recognizing apparatus which is used for an unspecified speaker, a similar effect is also obtained when the invention is applied to a voice recognizing apparatus which is used for a specified speaker. That is, when the word standard patterns which are stored in the word dictionary 5 in FIG. 1 are set to a vector time series indicative of a spectrum of the voice of the specified speaker as shown in FIG. 11 and the Euclidean distance shown by the following equation (5) or the city distance shown by the following equation (6) are used as a distance scale in place of the Mahalanobis distance shown by equation (1), the word spotting method for the specified speaker can be improved by substantially the same procedure as that in the first embodiment.

$$d(i,j) = \sum_j \sqrt{(x_i - u_j)^2} \quad (5)$$

$$d(i,j) = \sum_j |x_i - u_j| \quad (6)$$

In the above description, although the LPC cepstrum coefficient has been used as a parameter showing a feature of the voice, it will be understood that the effect of the invention is obtained irrespective of the kind of parameter so long as it expresses a feature of the voice.

What is claimed is:

1. A voice recognizing method comprising the steps of:

inputting a vocal sound into a voice recognition apparatus;

performing matching between the input vocal sound and stored standard patterns, the matching producing a matching score representative of the degree of similarity between the input vocal sound and a matched standard pattern;

correcting the matching score of a specific standard pattern produced in said performing step by multiplying the matching score of the specific standard pattern by a correction value corresponding to a time length of an input vocal sound matching the specific standard pattern; and determining a recognition result in accordance with the corrected matching score.

2. A method according to claim 1, wherein the step of correcting the matching score is executed by using as a reference the duration time in which a result of the matching step is best.

3. A method according to claim 1, wherein the step of correcting the matching score is executed so that the matching score is small as the duration time is short.

4. A method according to claim 1, wherein the matching step is performed by a word spotting method.

5. A method according to claim 1, wherein the stored voice standard patterns are expressed by characteristic parameters.

6. A method according to claim 1, wherein the input vocal sound is expressed by characteristic parameters.

7. A voice recognizing apparatus comprising:

standard pattern memory means for storing voice standard patterns;

voice input means for inputting a vocal sound;

matching means for performing matching between the input vocal sound and the stored standard patterns, the matching producing a matching score representative of the degree of similarity between the input vocal sound and a matched standard pattern;

matching score correcting means for correcting the matching score of a specific standard pattern produced by said matching means by multiplying the matching score of the specific standard pattern by a correction value corresponding to a time length of an input vocal sound matching the specific standard pattern; and determining means for determining a recognition result in accordance with the corrected matching score.

8. An apparatus according to claim 7, wherein said matching score correcting means corrects the matching score by using as a reference the duration time in which a result of the matching process which is obtained by said matching means is best.

9. An apparatus according to claim 7, wherein said matching score correcting means corrects the matching score so that the matching score is small as the duration time is short.

10. An apparatus according to claim 7, wherein the matching means includes means for performing the matching process by a word spotting method.

11. An apparatus according to claim 7, wherein the voice standard patterns which are stored in said standard pattern memory means are expressed by characteristic parameters.

12. An apparatus according to claim 7, wherein the input vocal sound voice information which is matched by said matching means is expressed by characteristic parameters.

13. A voice recognizing method comprising the steps of:
   inputting a vocal sound into a voice recognition apparatus;
   performing matching between the input vocal sound and stored standard patterns, including detecting a duration time of the input vocal sound which matched the standard pattern, the matching producing a matching score representative of the degree of similarity between the input vocal sound and a matched standard pattern;
   storing the matching score and duration time of a specific standard pattern;
   determining a correction coefficient for the matching score which is obtained in accordance with a ratio of the duration time of the specific standard pattern to that of a standard pattern having the highest matching score;
   correcting the matching score in accordance with the determined correction coefficient; and
   determining a recognition result in accordance with the corrected distance.

14. A method according to claim 13, wherein the step of correcting the matching score is executed by using as a reference the duration time in which a result of the matching process is best.

15. A method according to claim 13, wherein the step of correcting the matching score is executed so that the matching score becomes smaller as the duration time becomes shorter.

16. A method according to claim 13, wherein the matching step is performed by a word spotting method.

17. A method according to claim 13, wherein the stored voice standard patterns are expressed by characteristic parameters.

18. A method according to claim 13, wherein the input vocal sound is expressed by characteristic parameters.

19. A voice recognizing apparatus comprising:
   voice input means for inputting a vocal sound;
   matching means for performing matching between the input vocal sound and stored standard patterns, including means for detecting a duration time of the input vocal sound which matched the standard pattern, the matching producing a matching score representative of the degree of similarity between the input vocal sound and a matched standard pattern;
   memory means for storing the matching scores and duration time of a specific standard pattern;
   determination means for determining a correction coefficient for a matching score obtained in accordance with a ratio of the duration time of the specific standard pattern to that of a standard pattern having the highest matching score;
   matching score correction means for correcting the matching score in accordance with the determined correction coefficient; and
   recognition means for determining a recognition result in accordance with the corrected matching score.

20. An apparatus according to claim 19, wherein the matching score correction means includes means for correcting the matching score by using as a reference the duration time in which a result of the matching process is best.

21. An apparatus according to claim 19, wherein the matching score correction means includes means for correcting the matching score so that the matching score becomes smaller as the duration time becomes shorter.

22. An apparatus according to claim 19, wherein said matching means includes means for matching using a word spotting method.

23. An apparatus according to claim 19, wherein the voice standard patterns are stored as characteristic parameters.

24. An apparatus according to claim 19, wherein the input vocal sound is expressed as characteristic parameters.

25. A storage medium storing a computer program for instructing a voice recognition apparatus to perform a method comprising the steps of:
   inputting a vocal sound into the voice recognition apparatus;
   performing matching between the input vocal sound and stored standard patterns, the matching producing a matching score representative of the degree of similarity between the input vocal sound and a matched standard pattern;
   correcting the matching score of a specific standard pattern produced in said performing step by multiplying the matching score of the specific standard pattern by a correction value corresponding to a time length of an input vocal sound matching the specific standard pattern; and
   determining a recognition result in accordance with the corrected matching score.

26. A medium according to claim 25, wherein the step of correcting the matching score is executed by using as a reference the duration time in which a result of the matching step is best.

27. A medium according to claim 25, wherein the step of correcting the matching score is executed so that the matching score is small as the duration time is short.

28. A medium according to claim 25, wherein the matching step is performed by a word spotting method.

29. A medium according to claim 25, wherein the stored voice standard patterns are expressed by characteristic parameters.

30. A medium according to claim 25, wherein the input vocal sound is expressed by characteristic parameters.

31. A storage medium storing a computer program for instructing a voice recognition apparatus to perform a method comprising the steps of:
   inputting a vocal sound into the voice recognition apparatus;
   performing matching between the input vocal sound and stored standard patterns, including detecting a duration time of the input vocal sound which matched the standard pattern, the matching producing a matching score representative of the degree of similarity between the input vocal sound and a matched standard pattern;
   storing the matching score and duration time of a specific standard pattern;
   determining a correction coefficient for the matching score which is obtained in accordance with a ratio of the duration time of the specific standard pattern to that of a standard pattern having the highest matching score;
   correcting the matching score in accordance with the determined correction coefficient; and
   determining a recognition result in accordance with the corrected distance.

32. A medium according to claim 31, wherein the step of correcting the matching score is executed by using as a reference the duration time in which a result of the matching process is best.

33. A medium according to claim 31, wherein the step of correcting the matching score is executed so that the matching score becomes smaller as the duration time becomes shorter.

34. A medium according to claim 31, wherein the matching step is performed by a word spotting method.

35. A medium according to claim 31, wherein the stored voice standard patterns are expressed by characteristic parameters.

36. A medium according to claim 31, wherein the input vocal sound is expressed by characteristic parameters.

* * * * *

UNITED STATES PATENT AND TRADEMARK OFFICE
CERTIFICATE OF CORRECTION

PATENT NO. : 5,621,849
DATED : April 15, 1997
INVENTOR(S) : SAKURAI, ET AL.

It is certified that error appears in the above-indentified patent and that said Letters Patent is hereby corrected as shown below:

On the Cover Page, Item

[56] References Cited

Other Publications

"A Connected Spoken Recognition Method by O(n) Dynamic Programming," ICASSP '83, vol. 1, Wakagawa" should read --"A Connected Spoken Recognition Method by O(n) Dynamic Programming," ICASSP '83, vol. 1, Nakagawa--.

[57] ABSTRACT

Line 1, "method apparatus" should read --method and apparatus--.

COLUMN 1

Line 12, "voice" (second occurrence) should be deleted.

UNITED STATES PATENT AND TRADEMARK OFFICE
CERTIFICATE OF CORRECTION

PATENT NO.   : 5,621,849
DATED        : April 15, 1997
INVENTOR(S)  : SAKURAI, ET AL.

It is certified that error appears in the above-indentified patent and that said Letters Patent is hereby corrected as shown below:

COLUMN 4

Line 3, "invention" should read --invention,--.

Line 20, "voice/roku/and" should read --voice /roku/ and--.

Line 39, ""1"" should read as --"i"--.

Line 41, ""c""a"" should read --"c" indicates a--.

Line 65, "be ,described" should read --be described--.

Signed and Sealed this

Sixteenth Day of September, 1997

Attest:

*Attesting Officer*

BRUCE LEHMAN

*Commissioner of Patents and Trademarks*